Figure 1:
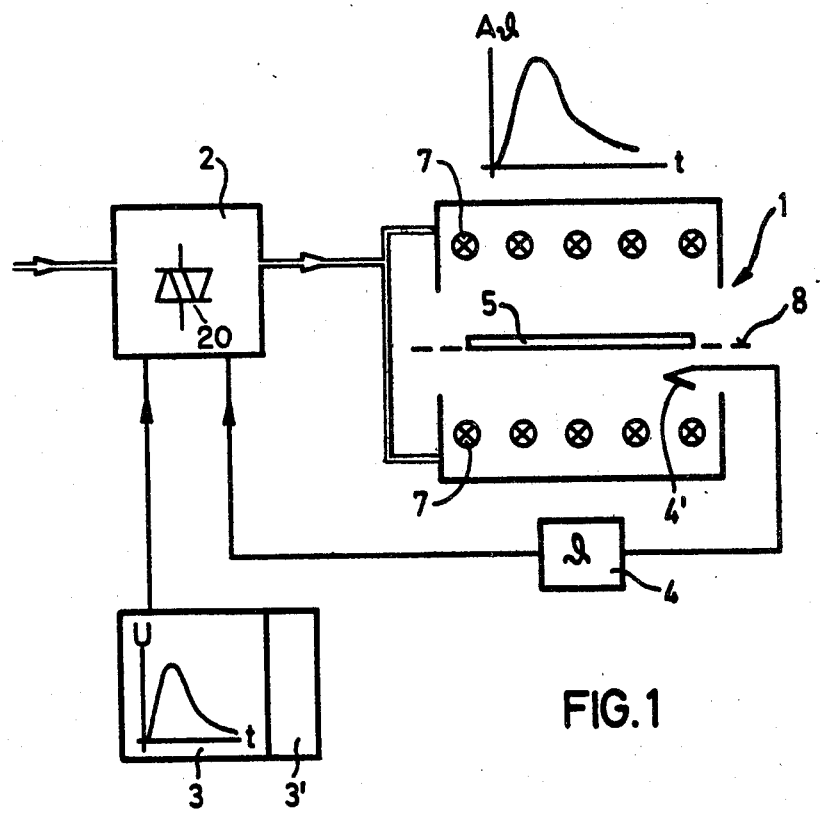

United States Patent [19]

Hagen et al.

[11] 4,366,369

[45] Dec. 28, 1982

[54] APPARATUS FOR HEATING SHEET-LIKE THERMOPLASTIC PRESHAPES

[75] Inventors: Karl Hagen, Friedelsheim; Karl H. Scholl, Lambsheim; Gerhard Schmelzer, Ludwigshafen, all of Fed. Rep. of Germany

[73] Assignee: BASF Aktiengesellschaft, Ludwigshafen, Fed. Rep. of Germany

[21] Appl. No.: 236,498

[22] Filed: Feb. 20, 1981

[30] Foreign Application Priority Data

Mar. 1, 1980 [DE] Fed. Rep. of Germany ....... 3007999

[51] Int. Cl.$^3$ .............................................. F27B 9/06
[52] U.S. Cl. .................................... 219/388; 219/216
[58] Field of Search ............... 219/216, 388, 469, 351, 219/358, 411, 494

[56] References Cited

U.S. PATENT DOCUMENTS

3,980,863 9/1976 Wulz et al. .................... 219/388
4,180,721 12/1979 Watanabe et al. ................ 219/216

FOREIGN PATENT DOCUMENTS

1072638 1/1960 Fed. Rep. of Germany.
2216651 10/1973 Fed. Rep. of Germany.
2728825 1/1979 Fed. Rep. of Germany.
2854393 7/1980 Fed. Rep. of Germany.

*Primary Examiner*—Volodymyr Y. Mayewsky
*Attorney, Agent, or Firm*—Keil & Witherspoon

[57] ABSTRACT

In an apparatus for heating preshapes consisting of a thermoplastic, in particular a fiber-reinforced plastic, the preshape is fed, by a conveyor belt, to a heating apparatus equipped with bright infra-red radiators. To provide time-dependent metering of the thermal energy, the installation possesses an electronic control unit, equipped with a microprocessor, which unit generates a periodically increasing and decreasing electrical signal voltage, whose time-curve and amplitude can be varied in accordance with the heat uptake capacity of the preshape. The signal voltage additionally controls a feed unit, which in turn feeds to the heating apparatus, by means of a phase control system, a periodic electric current which in its time-curve and amplitude corresponds to the pre-programmed signal voltage.

4 Claims, 2 Drawing Figures

APPARATUS FOR HEATING SHEET-LIKE THERMOPLASTIC PRESHAPES

The present invention relates to an apparatus for heating sheet-like preshapes, consisting of a thermoplastic, especially of a fiber-reinforced thermoplastic, by means of an infra-red heating apparatus to which the preshapes are fed by a conveyor belt.

Machine processing of preshapes consisting of a thermoplastic, or of a fiber-reinforced thermoplastic, to give shaped articles is usually carried out by an intermittent process, the time cycle of which is essentially dependent on the dimensions, structure and material of the preshapes. An important component of this cycle is the time which is required to heat the preshapes to the requisite processing temperature. Fitting this time into the production cycle, and varying the energy transfer in accordance with the properties of the preshapes, provide the basis for optimizing and streamlining the process.

It is known that in general the heating of thermoplastics has to be carried out at relatively low rates of supply of heat, since the low heat conductivity of the thermoplastics, combined with their heat sensitivity, does not allow them to be subjected to severe heat exposure. The use of a great variety of infrared heating equipment for generating the requisite thermal energy is well-known. With these, the preshapes are heated not only by radiation but also by heat conduction and by convection. Depending on the particular application, the heating apparatus is either switched on continuously and travels over the preshape to be heated, or is rigidly mounted and switched on and off for each heating cycle. The intensity of energy release by the infra-red radiator, whether by radiation or by conduction or convection, does not vary with time, except for the switch-on stage, so that different energy uptakes which may be required, due to the nature of the material or size of the preshape, in order to reach a given processing temperature can only be achieved by employing different heating times. This however necessarily produces temperature gradients in the preshape which is to be heated.

It is an object of the present invention to provide an apparatus in which the thermal energy to be supplied to the preshape can be metered as a function of time, and temperature gradients in the material can be virtually excluded.

We have found that this object is achieved, according to the invention, in an apparatus of the initially described type, by an electronic control unit provided with a microprocessor, which unit generates a periodically increasing and decreasing electrical signal voltage, whose time-curve and amplitude can be varied in accordance with the heat uptake capacity of the preshapes, and a feed unit, controlled by the signal voltage, which unit in turn meters to the heating apparatus, which is equipped with bright infra-red radiators, by means of a phase control system, a periodic electrical current which in its time-curve and amplitude corresponds to the pre-programmed signal voltage.

By this means, a relatively large amount of energy is supplied to the preshape at the start of a heating sequence. As a consequence of this high heat exposure, the material heats up very rapidly. At a constant rate of energy supply, the decomposition temperature of the thermoplastic would be reached within a short time. By means of the electronic unit, controlled by the microprocessor, it is however possible to reduce the rate of energy supply continuously from a maximum value and return it to zero. The rise to maximum intensity, the amplitude of the maximum, and the time-curve of the decrease in intensity are each also infinitely variable, making it possible to choose the optimum values for the size or properties of the preshape.

It has proved advantageous, overall, to employ, for such time-modulated intensity variation, a heating apparatus having a low time constant, in which short-term variations in feed voltage produce synchronous changes in the radiation intensity, and in particular to use a heating apparatus equipped with bright infra-red radiators.

The intensity variations to be provided are achieved by a feed unit, of appropriate size and consisting of controllable rectifiers, preferably a power control unit which operates on the phase control principle and feeds to the infra-red radiators an electric current analogous to the modulation. The feed unit is pilot-controlled by a pre-programmed signal voltage, which, in its amplitude, its time-curve and its frequency, encompasses all the features of the required intensity variations and also encompasses the predetermined time cycle. This signal voltage is generated periodically by a microprocessor. The characteristic features of this voltage, which directly correspond to the optimum heating conditions for a preshape of a particular origin, can be determined empirically by simple heating experiments. Once the optimum values have been established, they can, as required, be fed into the microprocessor as a program by means of the various methods of data processing, and be called up or reproduced when required.

According to a further feature of the invention, the installation possesses a temperature-regulating unit, which is interactively connected to the heating apparatus and to the feed unit. The temperature-regulating unit is connected in parallel to the control unit and consists of a sensing element, a regulator and a final control member. Should the feed unit fail, ie. should a selectable maximum temperature value be reached in the heating apparatus, the entire heating system is switched off without delay.

In a preferred embodiment of the installation, the heating apparatus possesses a plurality of heating zones arranged one after the other in the conveying direction and switchable sequentially, so that a preshape travelling on the conveyor belt can be synchronously subjected to the heat energy required at any point.

Furthermore, the control unit also allows variation of the speed of the conveyor belt as a function of the metering of thermal energy. This results in a time superposition of the travel sequence and the thermal energy metering, and in particular enables optimum heating conditions to be achieved.

The apparatus according to the invention may be used to heat sheet-like preshapes consisting of any thermoplastic, for example of olefin polymers, eg. polyethylene or polypropylene, styrene polymers, eg. polystyrene or styrene copolymers, chlorine-containing polymers, eg. polyvinyl chloride or chlorinated polyolefins, nylons, poly(methyl methacrylate), polycarbonates and blends of these polymers.

The plastics may contain the conventional additives, such as fillers, pigments, colorants, antistatic agents, stabilizers, flameproofing agents or lubricants.

The preshapes can also be fiber-reinforced. Suitable fibrous fillers are mats, webs, felts or woven fabrics, which may consist of glass fibers, carbon fibers, plastic fibers or asbestos.

Figure 2:
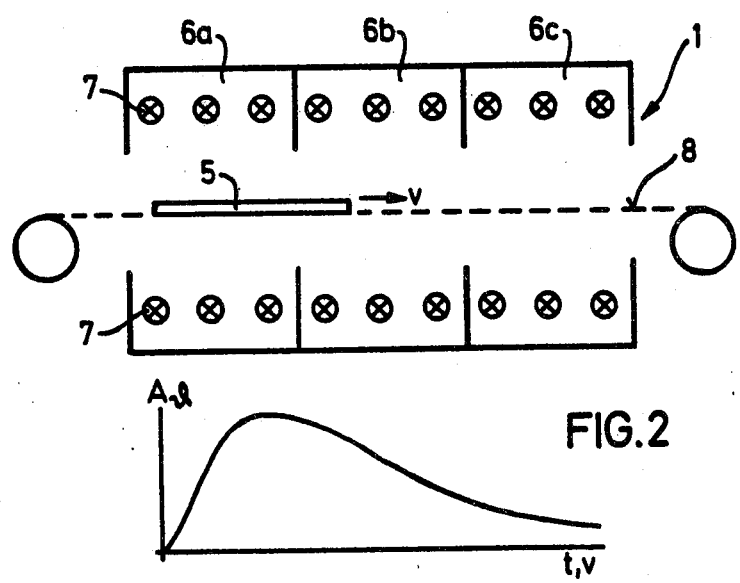

The invention is illustrated below by an Example with reference to the schematic drawing 1 in which FIG. 1 shows a schematic diagram of an apparatus according to the invention, and FIG. 2 shows a schematic diagram of the apparatus of FIG. 1 which has a plurality of heating zones.

As shown in FIGS. 1 and 2, the apparatus essentially consists of an infra-red heating unit (1), which is fitted with bright infra-red radiators (7) and is constructed of contiguous individual heating zones (6a–6c), in accordance with the dimensions of the preshape to be heated. The heating apparatus is supplied with energy from the feed unit (2). This unit is a semi-conductor apparatus, made up of controllable rectifiers, ie. thyristors, 20 and with this apparatus it is possible to meter the electric power infinitely variably up to a maximum which depends on the technical data of the rectifiers. Preferably, this metering is achieved by a phase control system, in which periodically generated needle pulses are shifted, in their phase position, relative to the alternating current or three-phase current employed as the feed. By means of these needle pulses, the controllable rectifiers are periodically brought from zero setting to maximum and vice versa, so that, depending on the phase position of the three-phase current or alternating current applied to them, they dose a varying current intensity to the infra-red radiators.

The control unit (3), which forms a single unit with the microprocessor (3'), serves to generate a periodic electrical vibration, whose time-curve and amplitude corresponds to the variation, as a function of time t, of the optimum heat uptake rate $A\theta$ of the preshape which is to be heated (FIG. 1). This vibration consists of a branch, rising to the maximum, in the shape of an exponential function, and an adjoining hyperbolic decrease region. It is generated as an electrical voltage U, as a function of time t, having values of from 0 to 10 V, or as an electrical current of from 0 to 20 mA. This control voltage or control current produces the phase shift between the needle pulses and the alternating current or three-phase current applied to the thyristors, and effects the power metering.

The optimum heat uptake/time function can be determined experimentally for any preshape. Thereafter, it can be stored by means of punched tape, punched cards or the like, and be called up by the microprocessor (3') and reproduced as often as desired. The frequency with which the vibration is generated can be set either by means of the microprocessor itself or by means of the time cycle of the preshape processing operation.

It is also possible, by changing the programming of the microprocessor, and by appropriate circuitry, to feed a selectable but constant electrical energy to the infra-red radiators and to achieve the metering of thermal energy to the preshape by a time-modulated duration of irradiation.

The optimum heat uptake function of the preshape can also be simulated by feeding the infra-red radiators, arranged in the direction of travel of the sheeting, in time sequence. By doing this, the time axis of the heat uptake function is replaced by the travel of the preshape, and the latter is directly exposed, at different places in the heating apparatus, to the optimum amount of radiation corresponding to the particular time value.

A temperature-regulating unit (4) is connected to the heating apparatus (1) and the feed unit (2). The temperature-regulating unit is intended to protect the preshape from over-exposure to heat in the event of a fault. Because of the high power per unit area in the heating apparatus, it is necessary to be able to switch off the installation rapidly and reliably in the event of a fault, for example if the controls fail. This is achieved by a temperature-regulating circuit which is independent of the controls and which consists of a temperature sensor (4'), a regulator, and a short-circuit switch. The temperature sensor (4') is located in the plane of the sheeting in the heating apparatus and is exposed to the same emission of radiation. The temperature sensed is continuously compared with a limiting value set on the regulator. If this value is exceeded, a relay contact in the regulator output short-circuits the control voltage for the power-setting unit. This immediately stops the supply of power.

A conveyor belt (8) delivers the preshapes (5) to the heating apparatus and transports them out of the latter after it has been heated up. The conveyor belt is driven by a variable-speed d.c. motor having a very low moment of inertia. This makes it possible to achieve a short time constant for the adjustment of the motor speed, and thus to time-modulate the rate of travel of the preshape in accordance with the optimum conditions for heating the material. This means that in the case of preshapes of large size, and corresponding high thermal energy requirements, the time-modulation of radiation emission need not be carried out with full amplitude—which can lead to undesirable mains fluctuations—and instead can be carried out with a particular, selectable portion of the requisite total power, the optimum irradiation time being achieved by variation of the speed of travel. Independently of this procedure, different speeds of entry and exit of the preshape can be selected.

We claim:

1. An arrangement for heating sheet-like preshapes consisting of a thermoplastic, especially of a fiber-reinforced thermoplastic, said arrangement comprising an infra-red heating apparatus equipped with bright infra-red radiators, a conveyor belt feeding the preshapes to said apparatus, an electronic control unit provided with a microprocessor, said control unit generating a periodically increasing and decreasing electrical signal voltage, whose time-curve and amplitude are variable in accordance with the heat uptake capacity of the preshapes, and a feed unit controlled by the signal voltage, said feed unit having phase-controlled rectifier means for in turn metering to the heating apparatus, a periodic electrical current which in its time-curve and amplitude corresponds to the preprogrammed signal voltage.

2. An arrangement as claimed in claim 1, which also comprises a temperature-regulating unit which is interactively connected to the heating apparatus and the feed unit.

3. An arrangement as claimed in claim 1 or 2, wherein the heating apparatus possesses a plurality of heating zones arranged in the direction of travel of the conveyor belt and switchable in sequence by the control unit.

4. An arrangement as claimed in claim 1, wherein the control unit is adapted to vary the speed of travel of the conveyor belt as a function of the metering of thermal energy.

* * * * *